United States Patent
Benson et al.

(10) Patent No.: US 9,341,199 B2
(45) Date of Patent: May 17, 2016

(54) TORQUE CONVERTER HYDRAULIC CONTROL SYSTEM FOR AN AUTOMATIC TRANSMISSION

(71) Applicant: GM Global Technology Operations LLC, Detroit, MI (US)

(72) Inventors: Christopher G. Benson, Rochester Hills, MI (US); Todd R. Berger, Pinckney, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 379 days.

(21) Appl. No.: 13/961,467

(22) Filed: Aug. 7, 2013

(65) Prior Publication Data

US 2014/0047828 A1 Feb. 20, 2014

Related U.S. Application Data

(60) Provisional application No. 61/683,013, filed on Aug. 14, 2012.

(51) Int. Cl.
*F15B 15/26* (2006.01)
*F16H 61/02* (2006.01)
*F16H 61/14* (2006.01)
*F16H 57/04* (2010.01)
*F16H 61/00* (2006.01)

(52) U.S. Cl.
CPC ............ *F15B 15/26* (2013.01); *F16H 61/0206* (2013.01); *F16H 61/143* (2013.01); *F16H 57/04* (2013.01); *F16H 2061/0037* (2013.01)

(58) Field of Classification Search
CPC ... F15B 15/26; F16H 61/0206; F16H 61/143; F16H 61/4157; F16H 61/4148; F16H 61/64; F16H 2061/0037; F16H 57/04; F16H 41/30; B60K 17/105; B60K 2741/26
USPC .......................................... 60/337; 192/3.29
See application file for complete search history.

(56) References Cited

U.S. PATENT DOCUMENTS

| | | | |
|---|---|---|---|
| 3,626,975 A * | 12/1971 | Bobst | F16K 17/0433 137/469 |
| 6,176,808 B1 * | 1/2001 | Brown | B60K 6/365 180/65.25 |
| 7,743,677 B2 | 6/2010 | Borgerson et al. | |
| 8,206,265 B2 * | 6/2012 | Maten | F16H 61/688 192/3.61 |
| 8,225,915 B2 | 7/2012 | Ames et al. | |
| 8,388,479 B2 | 3/2013 | Phillips et al. | |
| 8,579,094 B2 | 11/2013 | Moorman et al. | |
| 8,579,755 B2 | 11/2013 | Phillips | |
| 8,628,441 B2 | 1/2014 | Robinette et al. | |
| 8,652,002 B2 | 2/2014 | Otanez et al. | |
| 9,022,191 B2 * | 5/2015 | Jinno | F16H 61/143 192/3.29 |

* cited by examiner

*Primary Examiner* — Nathaniel Wiehe
*Assistant Examiner* — Logan Kraft

(57) ABSTRACT

A torque converter hydraulic control subsystem for a transmission is provided. The torque converter hydraulic control subsystem includes a source of pressurized hydraulic fluid that communicates with a torque converter clutch (TCC) regulation valve, a TCC control valve, and a lubrication boost valve. The torque converter hydraulic control subsystem is configured to provide cooling and lubrication fluid flow to a torque converter in all modes of operation.

20 Claims, 4 Drawing Sheets

TORQUE CONVERTER HYDRAULIC CONTROL SYSTEM FOR AN AUTOMATIC TRANSMISSION

CROSS-REFERENCE TO RELATED APPLICATIONS

The application claims the benefit of U.S. Provisional Application No. 61/683,013 filed on Aug. 14, 2012. The disclosure of the above application is incorporated herein by reference.

TECHNICAL FIELD

The invention relates to a torque converter control system for an automatic transmission, and more particularly to an electro-hydraulic torque converter control system.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, shift actuator subsystems that include actuators that engage the torque transmitting devices, and torque converter clutch control subsystems that engage a torque converter clutch. The pressurized hydraulic fluid delivered to the torque converter clutch control subsystem is used to apply or release the torque converter clutch to switch between a fluid coupling between the engine and the transmission and a direct drive, mechanical connection.

While previous torque converter hydraulic control systems are useful for their intended purpose, the need for new and improved torque converter hydraulic control system configurations within transmissions which exhibit improved performance, failure modes, and feedback response, is essentially constant. Accordingly, there is a need for an improved, cost-effective torque converter hydraulic control system for use in a hydraulically actuated automatic transmission.

SUMMARY

A torque converter hydraulic control subsystem for a transmission is provided. The torque converter hydraulic control subsystem includes a source of pressurized hydraulic fluid that communicates with a torque converter clutch (TCC) regulation valve, a TCC control valve, and a lubrication boost valve. The torque converter hydraulic control subsystem is configured to provide cooling and lubrication fluid flow to a torque converter in all modes of operation.

In one example, a system is provided that includes a source of pressurized hydraulic fluid, a torque converter actuator operable to engage a torque converter lock-up clutch, the torque converter actuator having a release side port and an apply side port, a cooler subsystem, and a control valve assembly. The control valve assembly includes a first port in communication with the source of pressurized hydraulic fluid, a second port in communication with the apply side port, a third port in communication with the cooler subsystem, a fourth port, a fifth port in communication with the source of pressurized hydraulic fluid, a sixth port in communication with the release side port, and a spool moveable between at least a first position and a second position. The first and fourth ports are isolated, the second port communicates with the third port, and the fifth port communicates with the sixth port when the spool is in the first position. The first port communicates with the second port, the fourth port communicates with the third port, and the fifth port is isolated when the spool is in the second position. A boost valve assembly is disposed directly between the fourth port and the source of pressurized hydraulic fluid, wherein the boost valve assembly communicates hydraulic fluid to the fourth port when the pressurized hydraulic fluid exceeds a threshold pressure.

In another example of the present invention, a control solenoid is in direct fluid communication with the spool of the control valve, and the control solenoid selectively communicates a pressurized hydraulic fluid signal that acts on the spool to move the spool between the first and second positions.

In yet another example of the present invention, the control solenoid is a normally low, variable force solenoid.

In yet another example of the present invention, the control valve assembly includes a signal port that communicates with a first end of the spool, and the control solenoid is in direct fluid communication with the signal port.

In yet another example of the present invention, a regulation valve assembly has a signal port in direct communication with the control solenoid, an inlet in communication with the source of pressurized hydraulic fluid, an outlet in direct communication with the first port of the control valve assembly, a feedback port, and a regulator spool moveable between a plurality of positions, and the signal port and the feedback port communicate with opposite ends of the regulator spool and the position of the regulator spool controls the amount of pressurized hydraulic fluid communicated from the inlet to the outlet.

In yet another example of the present invention, the boost valve assembly includes a first inlet in communication with the source of pressurized hydraulic fluid, a second inlet in communication with the source of pressurized hydraulic fluid through a first orifice, an outlet in direct communication with the fourth port, and a boost spool moveable between at least first and second positions wherein the boost spool prevents fluid communication between the first inlet and the outlet when in the first position and the boost spool allows fluid communication between the first inlet and the outlet when in the second position.

In yet another example of the present invention, the boost spool includes a first end, a second end in communication with the second inlet, and a biasing member in contact with the first end, wherein the boost spool is moved to the second position when a force acting on the second end by the pressurized hydraulic fluid exceeds a force acting on the first end by the biasing member.

In yet another example of the present invention, a second orifice is disposed directly between the outlet of the boost valve assembly and the fourth port of the control valve assembly.

In yet another example of the present invention, the outlet communicates directly with the source of pressurized hydraulic fluid through a third orifice.

In yet another example of the present invention, the threshold pressure is defined as the pressure from the source of pressurized hydraulic fluid associated with normal operating conditions of the motor vehicle.

In yet another example of the present invention, hydraulic fluid communicated to the apply side port engages the torque converter lock-up clutch and hydraulic fluid communicated to the release side port disengages the torque converter lock-up clutch.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
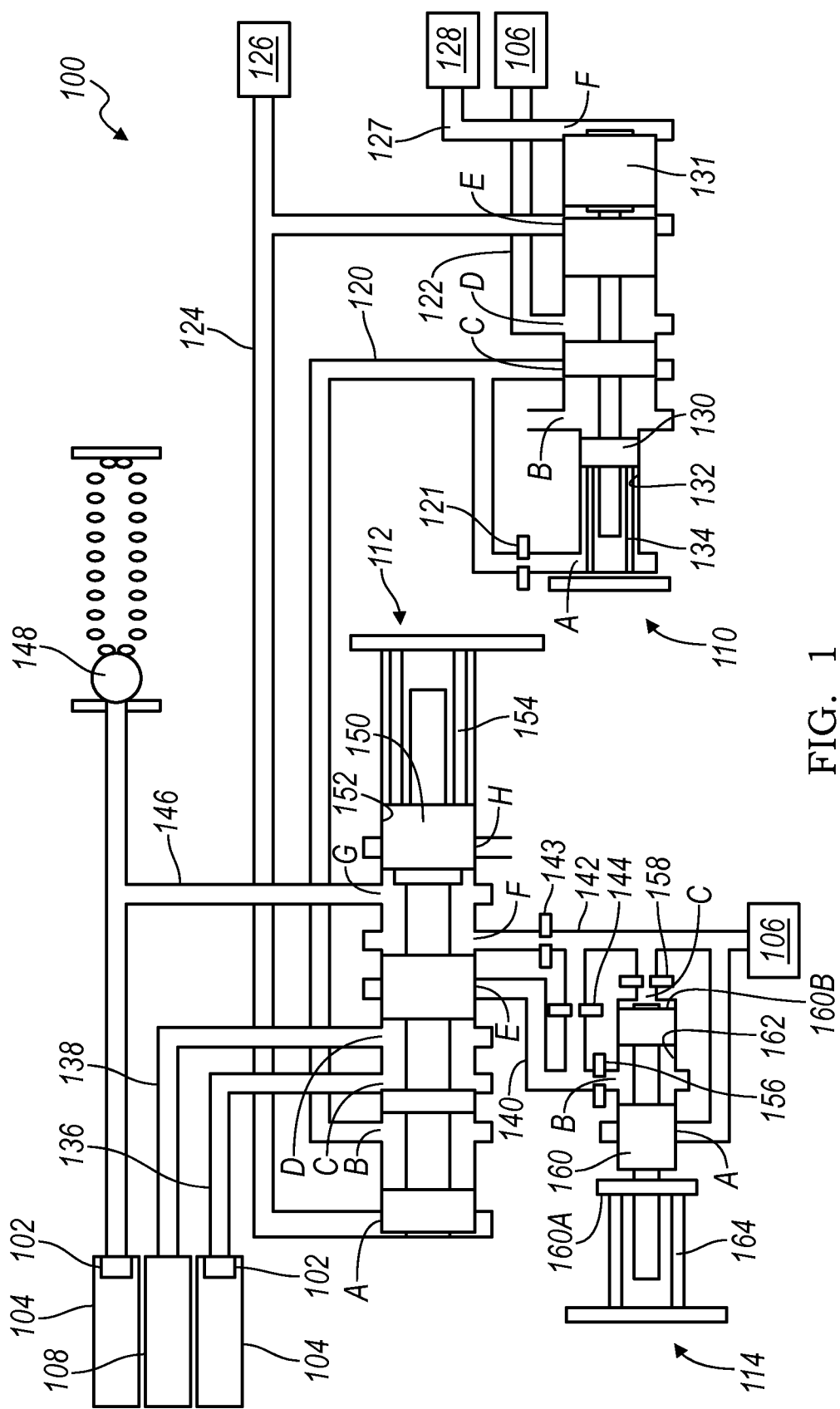
FIG. 1 is a diagram of a hydraulic control subsystem in a first operating state according to the principles of the present invention.

With reference to FIG. 1, a torque converter control (TCC) subsystem of a hydraulic control system for a transmission according to the principles of the present invention is generally indicated by reference number 100. The TCC subsystem 100 is operable to control the operating state of a torque converter clutch 102 disposed within a torque converter 104. The TCC subsystem 100 is in hydraulic communication with a pressure regulator subsystem 106 and a cooling subsystem 108. It should be appreciated that the TCC subsystem 100 may be in communication with various other hydraulic control subsystems, such as Electronic Transmission Range Selection (ETRS) or manual valve subsystems, lubrication subsystems, and/or clutch actuation subsystems, without departing from the scope of the present invention.

The pressure regulator subsystem 106 is operable to provide and regulate pressurized hydraulic fluid, such as transmission oil, to the TCC subsystem 100. The pressure regulator subsystem 106 may have various configurations but generally draws hydraulic fluid from a sump (not shown). The hydraulic fluid is forced from the sump and communicated through the TCC subsystem 100, and various other connected subsystems, via a pump (not shown). The pump is preferably driven by an engine (not shown) and may be, for example, a gear pump, a vane pump, a gerotor pump, or any other positive displacement pump. The pressure regulator subsystem 106 may also include an alternate source of hydraulic fluid that includes an auxiliary pump (not shown) preferably driven by an electric engine, battery, or other prime mover (not shown). The pressure and flow rates of the hydraulic fluid within the pressure regulator subsystem 106 may be further controlled by various interconnecting valves and solenoids, such as line pressure regulator valves, one-way valves, etc. The cooling subsystem 108 is used to dissipate heat stored in the hydraulic fluid. The cooling subsystem 108 may include various interconnected components (not shown) including, for example, an oil cooler, valves, and filters.

The TCC subsystem 100 includes a TCC regulator valve assembly 110, a TCC control valve assembly 112, and a lubrication boost valve assembly 114. The TCC regulator valve 110 includes fluid ports 110A-F. Fluid port 110A communicates with an apply line 120 and orifice 121. Fluid port 1108 is an exhaust port that communicates with the sump (not shown) or an exhaust backfill circuit. Fluid port 110C communicates with the apply line 120. Fluid port 110D communicates with a main supply line 122. The main supply line 122 supplies pressurized hydraulic fluid at line pressure (i.e. at pump pressure) from the pressure regulator subsystem 106. Fluid port 110E communicates with a signal line 124. The signal line communicates with a solenoid 126. The solenoid 126 is preferably a normally low, variable force solenoid. Fluid line 110F communicates with a signal line 127 which communicates with a solenoid 128.

The TCC regulator valve 110 further includes a spool valve 130 and a shuttle valve 131 slidably disposed within a bore 132. The spool 130 automatically changes position to control the flow from the main supply line 122 to the apply line 120. The position of the spool 130 is modulated by the solenoid 126. When the solenoid 126 is opened, pressurized fluid is supplied through the signal line 124 and fluid pressure acts upon the spool valve 130 through the fluid port 110E and moves the spool valve 130 against a spring 134 into a stroked position, by way of example. The spool valve 130 is actuated to a de-stroked position by the spring 134 when the solenoid 126 is closed. When the spool valve 130 is destroked fluid port 110D is isolated while fluid port 110C exhausts through exhaust port 1108. When the spool valve 130 is stroked, shown in FIG. 2, the exhaust port 1108 is isolated and fluid port 110D feeds pressurized hydraulic fluid to fluid port 110C. Feedback pressure is supplied to the valve spool 130 via fluid port 110A. Feedback pressure acts on the opposite side of the spool 130 and a force balance between the commanded pressure from the solenoid 126 and the feedback pressure is achieved on the spool 130.

The TCC control valve 112 includes fluid ports 112A-H. Fluid port 112A communicates with the signal line 124 and therefore the solenoid 126. Fluid port 112B communicates with the apply line 120. Fluid port 112C communicates with a TCC apply line 136. The TCC apply line 136 communicates with the torque converter clutch 102. Fluid port 112D communicates with a cooler line 138. The cooler line 138 communicates with the cooler subsystem 108. Fluid port 112E communicates with a cooler boost line 140. Fluid port 112F communicates with a converter feed line 142 and an orifice 143. The converter feed line 142 provides pressurized hydraulic fluid at a regulated pressure (i.e. pressure regulated by a regulator valve) from the pressure regulator subsystem 106. The converter feed line 142 also communicates with the cooler boost line 140 through an orifice 144. The fluid port 112G communicates with a TCC release line 146. The TCC release line 146 communicates with the torque converter clutch 102 and a pressure relief valve 148. If the pressure of the hydraulic fluid in the TCC release line 146 exceeds a pressure threshold, the pressure relief valve 148 opens momentarily to relieve and reduce the pressure of the hydraulic fluid within the TCC release line 146. Fluid port 112H is an exhaust port that communicates with the sump (not shown) or an exhaust backfill circuit.

The TCC control valve 112 further includes a spool valve 150 slidably disposed within a bore 152. When pressurized fluid is supplied through the signal line 124 by opening the solenoid 126, fluid pressure acts upon the spool valve 150 through the fluid port 112A and moves the spool valve 150 against a spring 154 into a stroked position, by way of example. The spool valve 150 is actuated to a de-stroked position by the spring 154 when the solenoid 126 is closed. When the spool valve 150 is destroked, shown in FIG. 1, fluid port 112B is isolated, fluid port 112D communicates with fluid port 112C, fluid port 112E is isolated, and fluid port 112F communicates with fluid port 112G. When the spool valve 150 is stroked, shown in FIG. 2, fluid port 112B communicates with fluid port 112C, fluid port 112E communicates with fluid port 112D, fluid port 112F is isolated, and fluid port 112G communicates with fluid port 112H.

The lubrication boost valve 114 includes fluid ports 114A-C. Fluid port 114A communicates with the converter feed line 142 which provides pressurized hydraulic fluid at a regulated pressure (i.e. pressure regulated by a regulator valve) from the pressure regulator subsystem 106. Fluid port 114B communicates with the cooler boost line 140 via an orifice 156. Fluid port 114C communicates with the converter feed line 142 via an orifice 158.

The lubrication boost valve 114 further includes a spool valve 160 slidably disposed within a bore 162. The spool valve 160 has a first end 160A and a second end 160B. When pressurized fluid is supplied through the converter feed line 142 fluid pressure acts upon the second end 160B of the spool valve 160 through the fluid port 114C and moves the spool valve 160 against a spring 164 acting on the first end 160A into a stroked position, by way of example. The spool valve 160 is actuated to a de-stroked position by the spring 164 when the pressure acting on the spool valve 160 drops, for example when fluid port 112F is opened by movement of the spool valve 150 of the TCC control valve 112. When the spool valve 160 is destroked, shown in FIG. 1, fluid ports 114A and 114B are isolated. When the spool valve 160 is stroked, shown in FIG. 2, fluid port 114A communicates with fluid port 114B.

To release the torque converter clutch 102, shown in FIG. 1, the solenoid 126 is closed thereby placing both the TCC regulator valve 110 and the TCC control valve 112 in the de-stroked positions. This prevents the regulator apply line 120 from communicating with the main supply line 122 and the TCC apply line 136 while the TCC release line 146 is fed hydraulic fluid at regulated pressure from the converter feed line 142. The TCC apply line 136 is exhausted into the cooler subsystem 108 via the cooler line 138.

Figure 2:
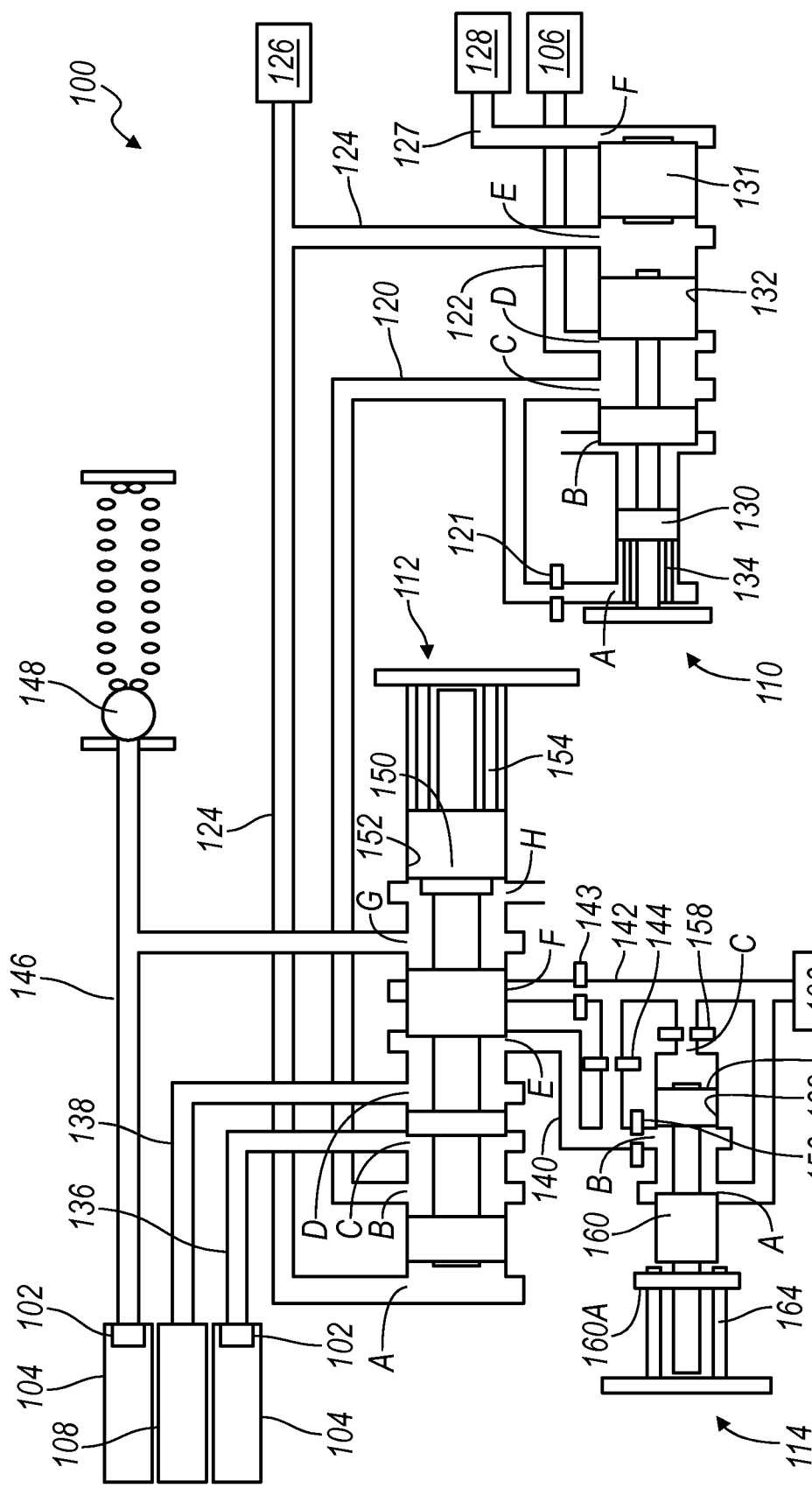
FIG. 2 is a diagram of the hydraulic control subsystem in a second operating state according to the principles of the present invention.

Turning to FIG. 2, to apply the torque converter clutch 102, the solenoid 126 is opened thereby placing both the TCC regulator valve 110 and the TCC control valve 112 in the stroked position. In addition, the lubrication boost valve 114 is stroked due to an increase in pressure at the fluid port 114C that exceeds a threshold pressure. The threshold pressure is defined as the pressure from the pressure regulator subsystem 106 associated with normal vehicle operating conditions. This provides a boost to the amount of fluid to the cooling subsystem 108. In the stroked conditions, the main supply line 122 feeds pressurized hydraulic fluid to the apply line 120 which in turn supplies the hydraulic fluid to the TCC apply line 136. Hydraulic fluid supplied to the TCC apply line 136 engages or applies the torque converter clutch 102. In addition, the TCC release line 146 is exhausted through port 112H and hydraulic fluid is sent to the cooler subsystem 108 through the cooler lines 138 and 140 from the converter feed line 142.

In the unlikely event of the TCC regulator valve 110 becoming stuck in the stroked condition, the TCC control valve 112 is configured such that hydraulic fluid is always communicating to the TCC apply line 136 and therefore providing cooling and lubrication to the torque converter 104.

Figure 3:
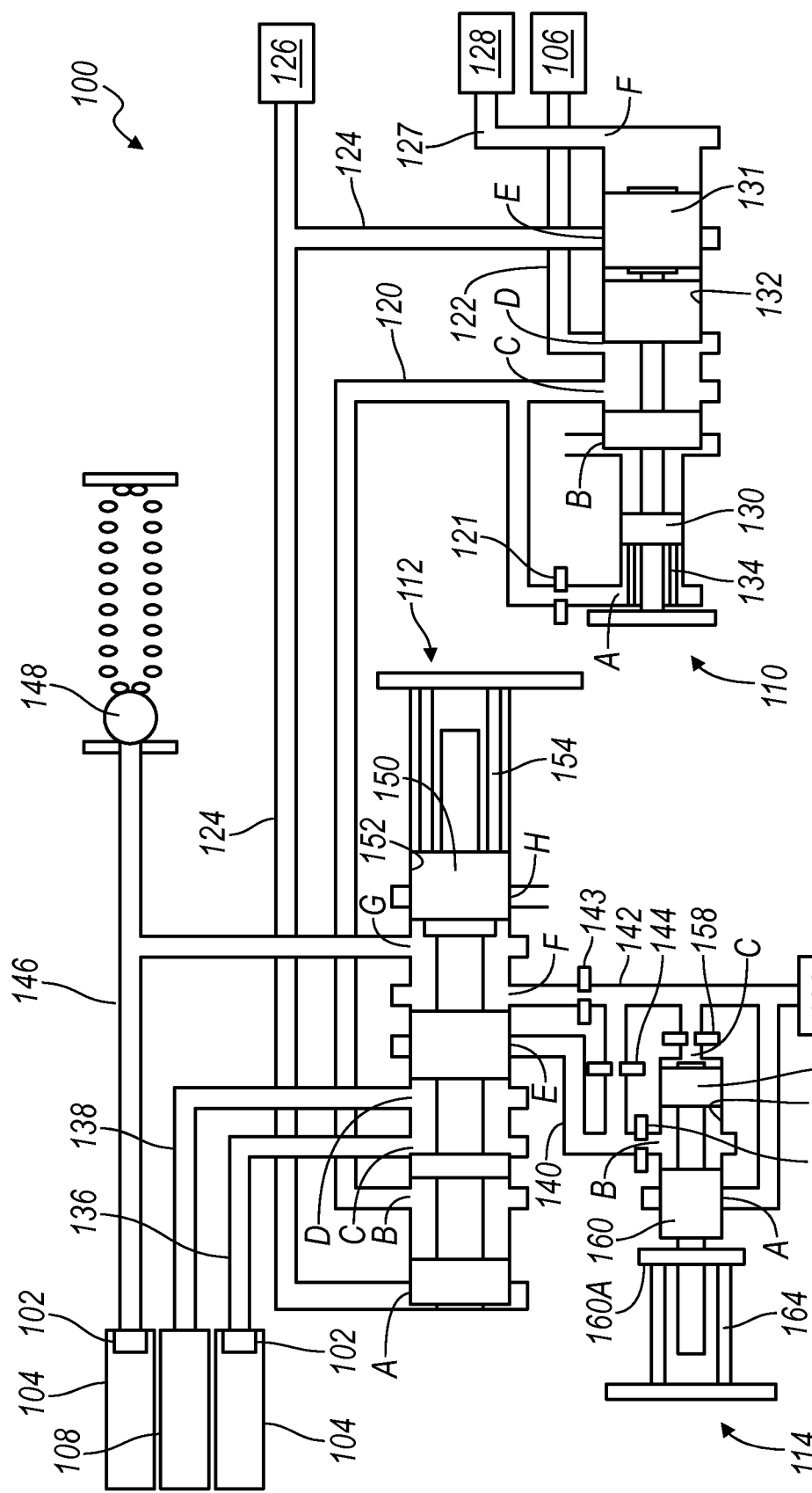
FIG. 3 is a diagram of the hydraulic control subsystem in a third operating state according to the principles of the present invention.
Figure 4:
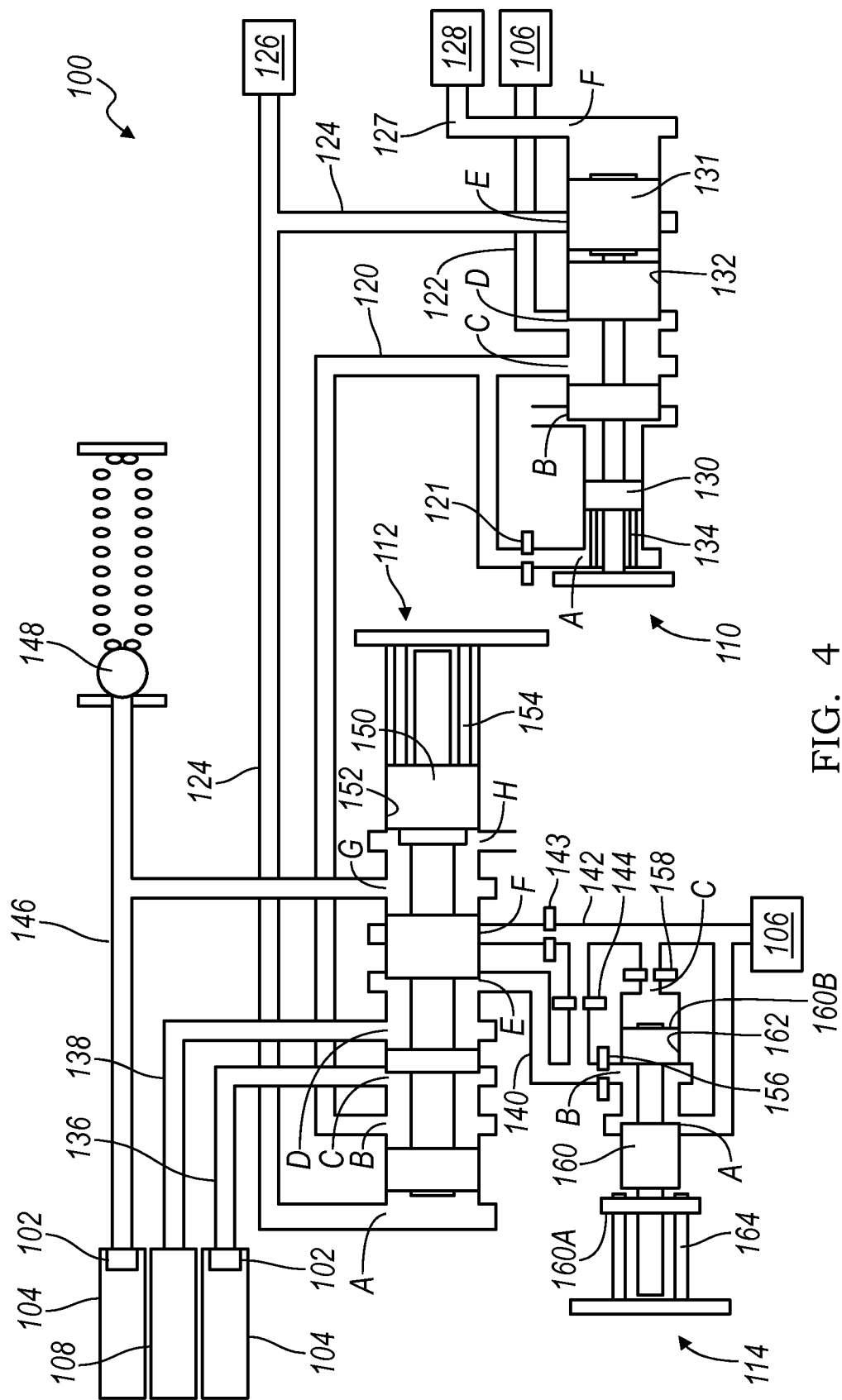
FIG. 4 is a diagram of the hydraulic control subsystem in a fourth operating state according to the principles of the present invention.

Turning to FIGS. 3 and 4, a means for detecting whether the TCC control valve 112 is stuck in the stroked position is illustrated. In addition to the solenoid 126 being capable of actuating the TCC regulator valve 130, the TCC regulator valve 130 may be actuated by solenoid 128. For example, solenoid 128 can provide a hydraulic fluid signal to act on the TCC regulator valve 130 via line 127 which is connected to port 110F. This hydraulic fluid signal acts on the TCC regulator shuttle valve 131 which contacts the spool 130 to move the TCC regulator spool valve 130 into the stroked position without affecting the position of the TCC control valve 112.

FIG. 3 shows the condition where solenoid 126 is closed and the TCC control valve 112 is located in the normal or destroked position. Under these conditions, when solenoid 128 is actuated to provide an elevated hydraulic fluid pressure, this elevated pressure is routed thru line 127 to port 110F. The elevated oil pressure in port 110F in turn acts on the TCC regulator shuttle valve 131 to move TCC regulator valve 130 into the stroked position. Pressure from the pressure regulator subsystem 106 is routed thru line 122 to port 110D. With TCC regulator valve 130 located in the stroked position, port 110D communicates with port 110C, and pressure from the pressure regulator subsystem 106 is routed thru line 120 to port 112B on the TCC control valve 112. With the TCC control valve 112 located in the destroked position, port 112B is isolated, so there is no change in the oil feed configuration to the torque converter clutch 102 as a result of the solenoid 128 being actuated to elevated pressure. With no change in the oil feed configuration to the torque converter clutch 102, there will be no change in the operating state of the torque converter clutch 102.

By monitoring engine speed and transmission input speed during this time, it can be verified that the operating state of the torque converter clutch 102 remains unchanged and the released mode is maintained. With no change in the torque converter clutch 102 operating state detected while solenoid 128 is actuated to elevated pressure, it is then verified that the TCC control valve 112 is located in the destroked position.

FIG. 4 shows the condition where solenoid 126 is closed and the TCC control valve 112 is located in the stuck or stroked position. Under these conditions, when solenoid 128 is actuated to an elevated pressure, this pressure is routed thru line 127 to port 110F. The elevated oil pressure in port 110F in turn acts on the TCC regulator shuttle valve 131 to move the TCC regulator valve 130 into the stroked position. Hydraulic fluid from the pressure regulator subsystem 106 is routed thru line 122 to port 110D. With the TCC regulator valve 130 located in the stroked position, port 110D communicates with port 110C, and hydraulic fluid from the pressure regulator subsystem 106 is routed thru line 120 to port 112B on the TCC control valve 112. With the TCC control valve 112 stuck in the stroked position, port 112B communicates with port 112C. The hydraulic fluid pressure from port 112C is routed thru line 136 to the torque converter clutch 102. Hydraulic fluid pressure from the other side of the torque converter clutch 102 is routed thru line 146 to port 112G. With the TCC control valve stuck in the stroked position, port 112G communicates with port 112H which is connected to exhaust. In this condition the torque converter clutch 102 will transition from the released state to the applied state.

By monitoring engine speed and transmission input speed during this time, it can be verified that there is a change in torque converter clutch 102 operating state from released to applied. With this change in the torque converter clutch 102 operating state detected while solenoid 128 is actuated to elevated pressure, it is then verified that the TCC control valve 112 is stuck in the stroked position, and an appropriate reaction can be commanded.

The description of the invention is merely exemplary in nature and variations that do not depart from the general essence of the invention are intended to be within the scope of the invention. Such variations are not to be regarded as a departure from the spirit and scope of the invention.

The following is claimed:

1. A system for a motor vehicle comprising:
a source of pressurized hydraulic fluid;
a torque converter actuator operable to engage a torque converter lock-up clutch, the torque converter actuator having a release side port and an apply side port;
a cooler subsystem;
a control valve assembly having a first port in communication with the source of pressurized hydraulic fluid, a second port in communication with the apply side port, a third port in communication with the cooler subsystem, a fourth port, a fifth port in communication with the source of pressurized hydraulic fluid, a sixth port in communication with the release side port, and a spool moveable between at least a first position and a second position, wherein the first and fourth ports are isolated, the second port communicates with the third port, and the fifth port communicates with the sixth port when the spool is in the first position, and wherein the first port communicates with the second port, the fourth port communicates with the third port, and the fifth port is isolated when the spool is in the second position; and
a boost valve assembly disposed directly between the fourth port and the source of pressurized hydraulic fluid, wherein the boost valve assembly communicates hydraulic fluid to the fourth port when the pressurized hydraulic fluid exceeds a threshold pressure,
wherein the boost valve assembly includes a first inlet in communication with the source of pressurized hydraulic fluid, a second inlet in communication with the source of pressurized hydraulic fluid through a first orifice, an outlet in direct communication with the fourth port, and a boost spool moveable between at least first and second positions wherein the boost spool prevents fluid communication between the first inlet and the outlet when in the first position and the boost spool allows fluid communication between the first inlet and the outlet when in the second position,
wherein the boost spool includes a first end, a second end in communication with the second inlet, and a biasing member in contact with the first end, wherein the boost spool is moved to the second position when a force acting on the second end by the pressurized hydraulic fluid exceeds a force acting on the first end by the biasing member,
further comprising a second orifice disposed directly between the outlet of the boost valve assembly and the fourth port of the control valve assembly,
wherein the outlet communicates directly with the source of pressurized hydraulic fluid through a third orifice.

2. The system of claim 1 wherein further comprising a control solenoid in direct fluid communication with the spool of the control valve, wherein the control solenoid selectively communicates a pressurized hydraulic fluid signal that acts on the spool to move the spool between the first and second positions.

3. The system of claim 2 wherein the control solenoid is a normally low, variable force solenoid.

4. The system of claim 2 wherein the control valve assembly includes a signal port that communicates with a first end of the spool, and wherein the control solenoid is in direct fluid communication with the signal port.

5. The system of claim 2 further comprising a regulation valve assembly having a signal port in direct communication with the control solenoid, an inlet in communication with the source of pressurized hydraulic fluid, an outlet in direct communication with the first port of the control valve assembly, a feedback port, and a regulator spool moveable between a plurality of positions, wherein the signal port and the feedback port communicate with opposite ends of the regulator spool and the position of the regulator spool controls the amount of pressurized hydraulic fluid communicated from the inlet to the outlet.

6. The system of claim 1 wherein the threshold pressure is defined as the pressure from the source of pressurized hydraulic fluid associated with normal operating conditions of the motor vehicle.

7. The system of claim 1 wherein hydraulic fluid communicated to the apply side port engages the torque converter lock-up clutch and hydraulic fluid communicated to the release side port disengages the torque converter lock-up clutch.

8. A system for a motor vehicle comprising:
a source of pressurized hydraulic fluid;
a torque converter actuator operable to engage a torque converter lock-up clutch, the torque converter actuator having a release side port and an apply side port;
a cooler subsystem;
a control valve assembly having first, second, third, fourth, fifth, and sixth ports, and a spool moveable between at least a first position and a second position, wherein the first and fourth ports are isolated, the second port communicates with the third port, and the fifth port communicates with the sixth port when the spool is in the first position, and wherein the first port communicates with the second port, the fourth port communicates with the third port, and the fifth port is isolated when the spool is in the second position;
a boost valve assembly having an inlet in communication with the source of pressurized hydraulic fluid and an outlet;
a pressure regulator valve assembly having an inlet in communication with the source of pressurized hydraulic fluid and an outlet;
a first fluid line connected to the first port and to the outlet of the pressure regulator valve assembly;
a second fluid line connected to the second port and to the apply side port;
a third fluid line connected to the third port and to the cooler subsystem;
a fourth fluid line connected to the fourth port and the outlet of the boost valve assembly;
a fifth fluid line connected to the fifth port and to the source of pressurized hydraulic fluid; and
a sixth fluid line connected to the sixth port and to the release side port;
wherein the boost valve assembly communicates hydraulic fluid to the fourth port when the pressurized hydraulic fluid in the fifth fluid line exceeds a threshold pressure.

9. The system of claim 8 wherein the control valve assembly includes an exhaust port and the sixth port communicates with the exhaust port when the spool is in the second position.

10. The system of claim 8 further comprising a blow-off valve connected to the sixth fluid line.

11. The system of claim 8 wherein the regulation valve assembly further includes a signal port, a feedback port connected to the first fluid line, and a regulator spool moveable between a plurality of positions, wherein the signal port and the feedback port communicate with opposite ends of the regulator spool and the position of the regulator spool controls the flow of pressurized hydraulic fluid communicated from the inlet of the regulator valve assembly to the outlet of the regulator valve assembly.

12. The system of claim 11 wherein the control valve assembly includes a signal port, and the system further comprises a signal fluid line connected to the signal port of the control valve assembly and the signal port of the pressure regulator assembly and a control solenoid connected to the signal fluid line, wherein the control solenoid selectively communicates a pressurized hydraulic fluid signal that acts on the spool to move the spool between the first and second positions and acts on the regulator spool to move the regulator spool between the plurality of positions.

13. The system of claim 8 further comprising an eighth fluid line connected between the fourth fluid line and the fifth fluid line and an orifice disposed within the eighth fluid line.

14. A system for a motor vehicle comprising:
a source of pressurized hydraulic fluid;
a torque converter actuator operable to engage a torque converter lock-up clutch, the torque converter actuator having a release side port and an apply side port;
a cooler subsystem;
a control valve assembly having first, second, third, fourth, fifth, and sixth ports, and a spool moveable between at least a first position and a second position, wherein the first and fourth ports are isolated, the second port communicates with the third port, and the fifth port communicates with the sixth port when the spool is in the first position, and wherein the first port communicates with the second port, the fourth port communicates with the third port, and the fifth port is isolated when the spool is in the second position;
a boost valve assembly having an inlet in communication with the source of pressurized hydraulic fluid and an outlet;
a pressure regulator valve assembly having an inlet in communication with the source of pressurized hydraulic fluid and an outlet;
a first fluid line connected to the first port and to the outlet of the pressure regulator valve assembly;
a second fluid line connected to the second port and to the apply side port;
a third fluid line connected to the third port and to the cooler subsystem;
a fourth fluid line connected to the fourth port and the outlet of the boost valve assembly;
a fifth fluid line connected to the fifth port and to the source of pressurized hydraulic fluid; and
a sixth fluid line connected to the sixth port and to the release side port;
wherein the boost valve assembly includes a second inlet connected to the fifth fluid line through a first orifice and a boost spool moveable between at least first and second positions, wherein the boost spool prevents fluid communication between the inlet and the outlet when in the first position and the boost spool allows fluid communication between the inlet and the outlet when in the second position.

15. The system of claim 14 wherein the control valve assembly includes an exhaust port and the sixth port communicates with the exhaust port when the spool is in the second position.

16. The system of claim 14 further comprising a blow-off valve connected to the sixth fluid line.

17. The system of claim 14 wherein the regulation valve assembly further includes a signal port, a feedback port connected to the first fluid line, and a regulator spool moveable between a plurality of positions, wherein the signal port and the feedback port communicate with opposite ends of the regulator spool and the position of the regulator spool controls the flow of pressurized hydraulic fluid communicated from the inlet of the regulator valve assembly to the outlet of the regulator valve assembly.

18. The system of claim 17 wherein the control valve assembly includes a signal port, and the system further comprises a signal fluid line connected to the signal port of the control valve assembly and the signal port of the pressure regulator assembly and a control solenoid connected to the signal fluid line, wherein the control solenoid selectively communicates a pressurized hydraulic fluid signal that acts on the spool to move the spool between the first and second positions and acts on the regulator spool to move the regulator spool between the plurality of positions.

19. The system of claim 14 further comprising an eighth fluid line connected between the fourth fluid line and the fifth fluid line and a second orifice disposed within the eighth fluid line.

20. A system for a motor vehicle comprising:
a source of pressurized hydraulic fluid;
a torque converter actuator operable to engage a torque converter lock-up clutch, the torque converter actuator having a release side port and an apply side port;
a cooler subsystem;
a control valve assembly having first, second, third, fourth, fifth, and sixth ports, a signal port, and a spool moveable between at least a first position and a second position, wherein the first and fourth ports are isolated, the second port communicates with the third port, and the fifth port communicates with the sixth port when the spool is in the first position, and wherein the first port communicates with the second port, the fourth port communicates with the third port, and the fifth port is isolated when the spool is in the second position;
a boost valve assembly having an inlet in communication with the source of pressurized hydraulic fluid and an outlet;
a pressure regulator valve assembly having an inlet in communication with the source of pressurized hydraulic fluid, an outlet, a first signal port, a second signal port, a regulator spool moveable between at least a first position and a second position, and a shuttle in selective contact with the regulator spool and moveable between at least a first and a second position, wherein the first signal port communicates with an end of the regulator spool and the second signal port communicates with an end of the shuttle;
a first control solenoid;
a second control solenoid;
a first fluid line connected to the first port and to the outlet of the pressure regulator valve assembly;
a second fluid line connected to the second port and to the apply side port;
a third fluid line connected to the third port and to the cooler subsystem;

a fourth fluid line connected to the fourth port and the outlet of the boost valve assembly;
a fifth fluid line connected to the fifth port and to the source of pressurized hydraulic fluid;
a sixth fluid line connected to the sixth port and to the release side port;
a seventh fluid line connected to the signal port of the control valve assembly, the first signal port of the pressure regulator assembly and the first control solenoid; and
an eighth fluid line connected to the second signal port of the pressure regulator assembly and the second control solenoid.

* * * * *